Patented Feb. 17, 1925.

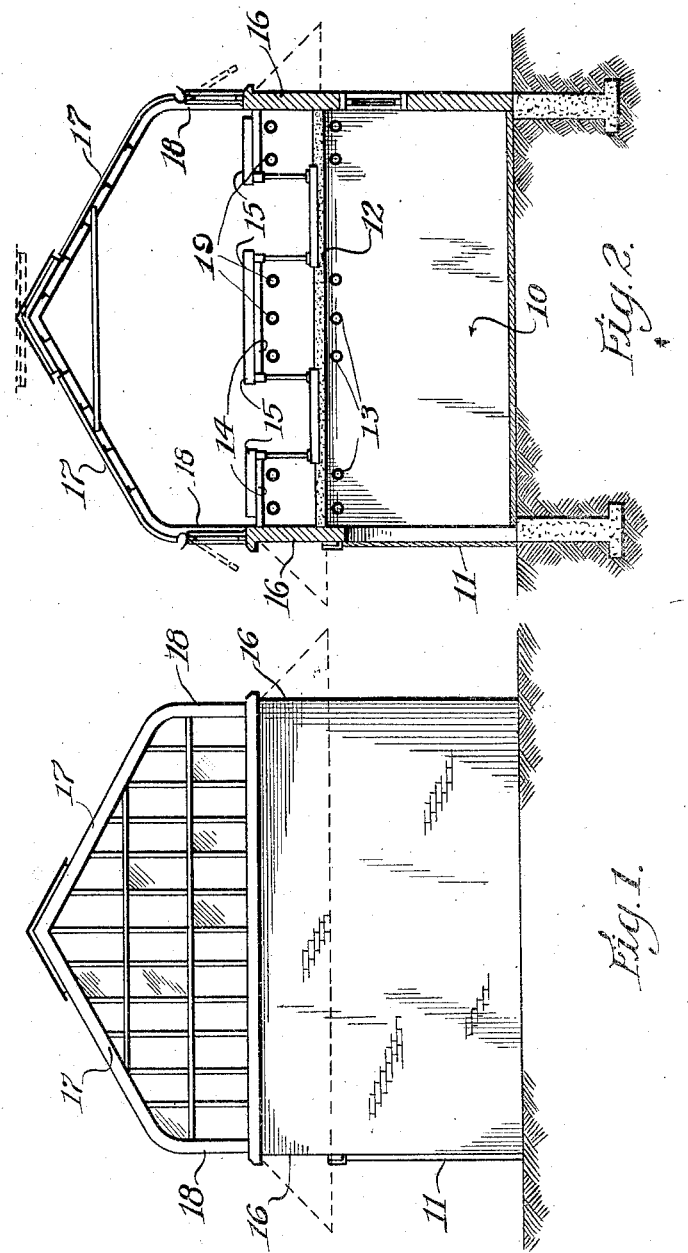

1,526,766

UNITED STATES PATENT OFFICE.

WARD S. ARNOLD, OF CHICAGO, ILLINOIS.

GREENHOUSE.

Application filed August 1, 1924. Serial No. 729,467.

*To all whom it may concern:*

Be it known that I, WARD S. ARNOLD, a citizen of the United States, residing at Chicago, in the county of Cook and State of Illinois, have invented certain new and useful Improvements in Greenhouses, of which the following is a specification.

Contrary to the apparent generally accepted opinion of those skilled in the art, I have discovered by experimenting and research work that improved results are obtained in raising or growing garden vegetables in cold climates during the winter months by supporting the beds a considerable distance above the ground, within a glass enclosure and immediately over a heated enclosed room used as a dwelling or for garage purposes.

Aside from the improved results obtained by such a structure in the growing of vegetables, it possesses many marked advantages, among others, economizes space, a very important thing, especially in thickly settled and congested sections of the cities. With this arrangement a combined greenhouse and dwelling or garage can be had at little more than the cost of one, and in the operation thereof a great saving in heat is effected. Moreover, in such a structure having the beds supported a considerable distance above the ground they are afforded considerably more sunlight than in the old structures, particularly in the congested sections where the buildings are closely associated one with another. If one attempts to raise garden vegetables, for instance, in the back yard, assuming that he has ground space not already covered by some building, he usually finds that the sunlight is shut off from such space by the buildings, fences and other structures for a considerable portion, if not most of the time, but with my invention I have made it entirely practical for the dwellers in the thickly congested localities of the cities to economically raise, with very little trouble or expense, garden vegetables in substantial quantities throughout the year without utilizing ground space not used for other purposes and, further, with my invention the beds are not subjected to the frosts coming up from the ground below, particularly in cold climates, as is true with the old structures.

Therefore it is an object of my invention to provide an improved greenhouse particularly adapted for the practical raising of garden vegetables throughout the year in thickly settled and congested sections of the cities, and without utilizing ground space not already preempted.

The above and other features of novelty, advantages and capabilities will become apparent from a detail description of the accompanying drawings, in which I have illustrated one form of my invention, but the construction there shown will be understood as illustrative only, and not as defining the limits of my invention.

In the drawings—

Figure 1 is an end elevational view of a greenhouse embodying one form of my invention; and Figure 2 is a vertical sectional view of the same.

Referring to the drawings in detail, 10 indicates a comparatively large enclosed room having side and end walls with a suitable slide door 11, which room, in the form shown, is suitable for a garage. This room has a comparatively high ceiling 12, in practice about ten to twelve feet above the floor, and is heated by suitable steam pipes 13, leading from a source of supply not shown, or other suitable means. Supported above and on the ceiling 12 are longitudinally extending racks 14. On these racks are boxes 15 containing suitable soil to form beds for the raising or growing of vegetables. The side and end walls are provided with extensions 16 extending upwardly beyond the ceiling 12. Supported on these extensions is a glass and metal gable roof 17 provided with vertical end and side portions 18. This roof extends above and over, forming an enclosed compartment of the beds or boxes 15. If desired the roof may be provided at its apex or in the side portions with swinging openings of any suitable form for ventilating purposes, as best shown in open position in dotted lines in Figure 2. The pipes 13 may be extended upwardly and longitudinally along under the racks 14, as best shown at 19 in Figure 2, for heating the upper compartment in which the beds are located.

From the foregoing description it will be apparent that I have provided a structure which possesses to the fullest extent all of the features which I have heretofore pointed out, and many other inherent advantages.

Having thus described my invention, I claim:

In a greenhouse, a comparatively large enclosed room adapted to be occupied as a dwelling or garage provided with a comparatively high ceiling, means for heating said room, walls extending upwardly from said ceiling, beds suitable for growing vegetables supported above and on such ceiling, a combined glass and metal gable roof provided with side and end members supported on said extensions entirely enclosing and forming a separate compartment for said beds, and means for heating said compartment.

In witness whereof, I have hereunto subscribed my name to this specification in the presence of witnesses.

WARD S. ARNOLD.

Witnesses:
 CLARENCE J. LOFTUS,
 M. J. RYAN.